United States Patent [19]
Kwon et al.

[11] Patent Number: 5,516,056
[45] Date of Patent: May 14, 1996

[54] VIDEOTAPE CASSETTE

[75] Inventors: Jun-Tae Kwon; In-Su Han, both of Chungcheongnam, Rep. of Korea

[73] Assignee: SKC Limited, Suwon, Rep. of Korea

[21] Appl. No.: 310,763

[22] Filed: Sep. 27, 1994

[30] Foreign Application Priority Data

Sep. 28, 1993 [KR] Rep. of Korea ............... 93-19965

[51] Int. Cl.⁶ .................................................. G11B 23/087
[52] U.S. Cl. .................................. 242/345.2; 242/347
[58] Field of Search ........................ 242/347, 347.1, 242/345.2; 360/132; 206/389, 391, 403, 409

[56] References Cited

U.S. PATENT DOCUMENTS

| | | | |
|---|---|---|---|
| 4,665,456 | 5/1987 | Ahlberg et al. | 360/132 |
| 4,831,482 | 5/1989 | Sato . | |
| 5,181,153 | 1/1993 | Nishimura | 242/345.2 |
| 5,184,255 | 2/1993 | Lowry et al. | 360/132 |
| 5,189,583 | 2/1993 | Okamura et al. | 360/132 |
| 5,201,476 | 4/1993 | Gelardi et al. | 242/347 |
| 5,398,147 | 3/1995 | Johanson | 360/132 |
| 5,411,219 | 5/1995 | Yi et al. | 242/347 |

*Primary Examiner*—John P. Darling
*Attorney, Agent, or Firm*—Finnegan, Henderson, Farabow, Garrett and Dunner

[57] ABSTRACT

The upper cassette casing of a videotape cassette comprises a base panel and peripheral walls vertically extending from corresponding edges thereof. The base panel is provided with a first section which carries a pressure spring adapted to depress the tape reels toward the lower cassette casing, and a second section surrounding the first section, the second section having a thickness less than that of the first section. Each of the peripheral walls includes a plurality of reinforcement ribs which inwardly protrude therefrom, and is of a substantially same thickness with respect to each other and as that of the second section of the base panel. The thickness of the second section of the base panel and the peripheral walls is as thin as 50 percent of that of the first section.

3 Claims, 3 Drawing Sheets

VIDEOTAPE CASSETTE

FIELD OF THE INVENTION

The present invention relates to a videotape cassette comprising an upper and a lower cassette casings combined together and; more particularly, to such a videotape cassette which includes a reel pressure spring carried by the upper cassette casing.

DESCRIPTION OF THE PRIOR ART

As is well known, a videotape cassette comprises a housing which is provided with an upper and a lower cassette casings combined together to contain therein a pair of tape reels. The upper cassette casing generally includes various physical structures integrally moulded therewith, and functional structures, e.g., a reel pressure spring carried by the inner surface thereof. Presence of these physical and functional structures leads to a greater material requirement, lengthier manufacturing process and increased production cost of the cassette.

In order to overcome the above problem, U.S. Ser. No. 08/101,444 filed on Aug. 2, 1993 by Gil-Goo Yi, et al. discloses an improved videotape cassette case comprising an upper cassette casing which includes on its base panel a U-shaped rib and a pair of bosses with a plurality of radially extending ribs. The upper casing further comprises a plurality of ribs protruding from the rear and the side walls thereof. This cassette has an advantage in that the complicated internal structures are significantly eliminated.

In U.S. Pat. No. 5,189,183 issued to Okamura et al., there is proposed a magnetic tape cassette which comprises grid-like ribs in the reel area of the base panel of the upper casing. The ribs coact to produce therebetween a number of recesses, whose depth is varied in correspondence to the degree of roughness of the outer surface of the casing, thereby saving the material used in the base panel.

Although the above cassettes may accomplish a reduction in the amount of the material required for moulding the upper cassette casing by way of providing various reinforcing ribs, it still remains desirable to reduce the thickness of the upper casing without incurring an added risk of its fracture during the manufacturing, transporting or handling of the videotape cassette. Further, it is desired that the reel pressure spring be structured in such a manner to properly act against the tape reels in spite of the reduction in the material used in producing the upper casing.

SUMMARY OF THE INVENTION

Accordingly, it is an object of the present invention to provide an improved videotape cassette which is made at a reduced cost.

It is another object of the present invention to provide a videotape cassette which is manufactured with an increased efficiency.

It is a further object of the present invention to provide a videotape cassette which includes an upper casing of a thinner thickness without increasing the danger of the damaging thereof and is able to allow the reel pressure spring to sustain an appropriate pressing force exerted against the tape reels.

In accordance with the instant invention, there is provided a videotape cassette including an upper and a lower cassette casings combined together to contain therein a pair of tape reels, the upper cassette casing comprising: a base panel including a first elongated section which carries a pressure spring adapted to depress the tape reels toward the lower cassette casing, and a pair of elongated second sections having a thickness smaller than that of the first section; and peripheral walls, vertically extending from their corresponding edges of the base panel, including a plurality of reinforcement ribs which inwardly protrude therefrom, each of the ribs having a substantially same thickness as that of the second section.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
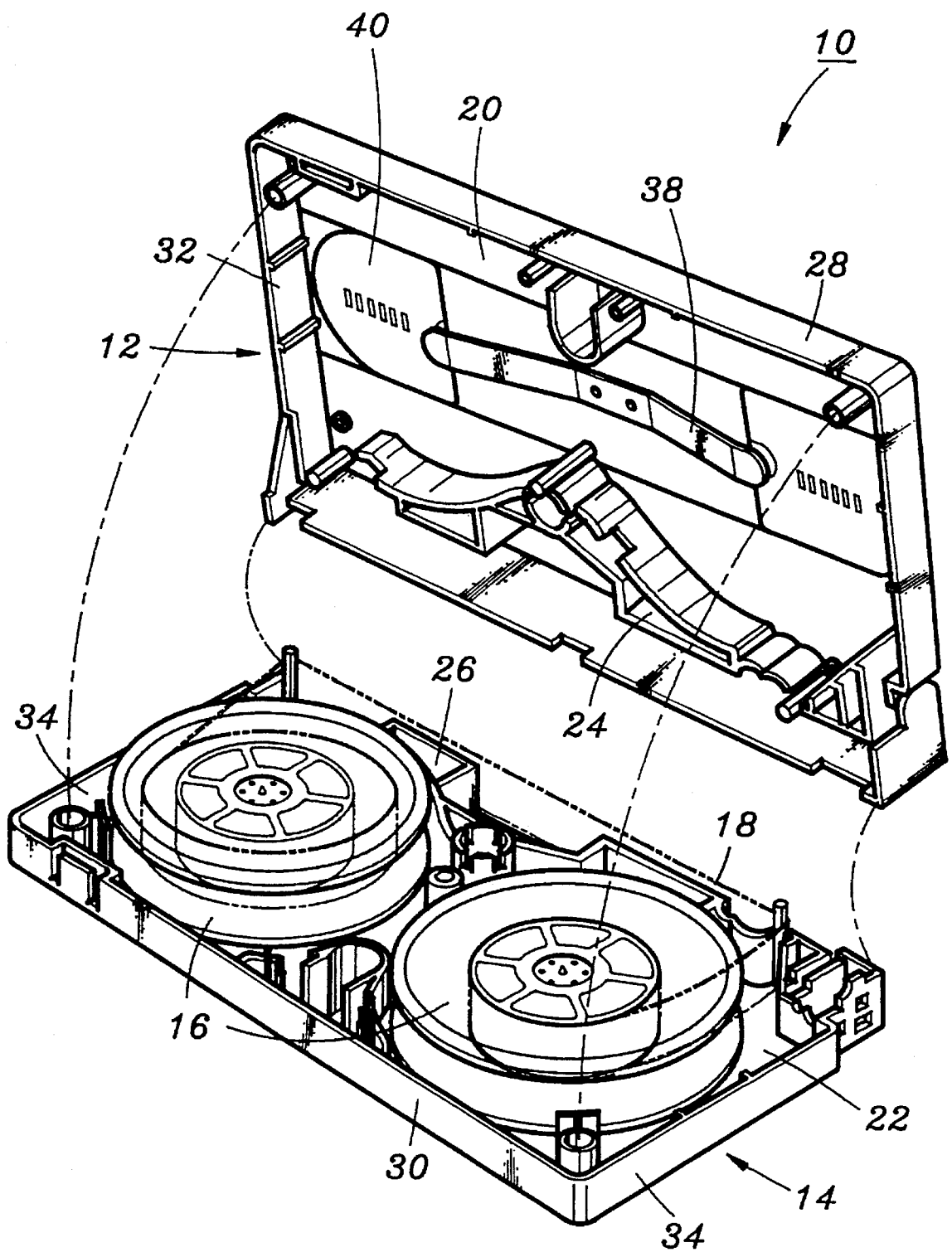
FIG. 1 is a schematic perspective view of a videotape cassette in accordance with the present invention, illustrating an upper and a lower cassette casings removed from each other.

Referring to FIG. 1, there is shown a videotape cassette of the instant invention, generally designated by reference numeral 10, which is intended for use in a video cassette recorder(VCR). As shown, the videotape cassette 10 comprises a cartridge or a housing which is provided with an upper and a lower cassette casings 12, 14 combined together to accommodate therein a pair of reels 16 wound with a length of a videotape 18. The upper and the lower cassette casings 12, 14 are, respectively, provided with a generally rectangular base panel 20, 22, a front wall 24, 26, a rear wall 28, 30 and a pair of side walls 32, 34, with each of the walls vertically extending from the peripheral edges of the rectangular base panel 20, 22 toward the corresponding walls of the other casing to mate with each other.

Figure 2A:
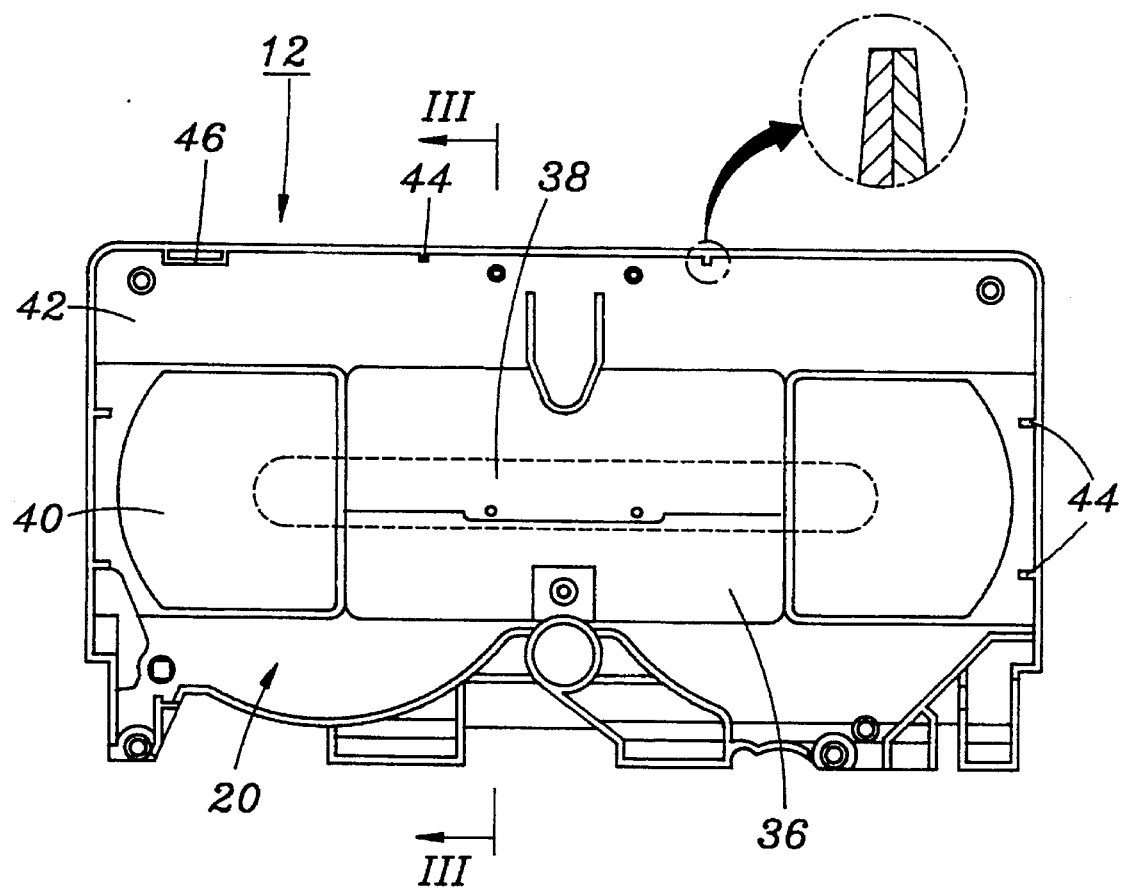
FIG. 2a is a bottom view of the upper cassette casing and FIG. 2b is a plan view of the lower cassette casing, each showing arrangements for reinforcing the casings in more detail, with the tape reels eliminated.

As shown in FIGS. 2a and b, the base panel 20 of the upper casing 12 includes a first section 36 carrying on its inner surface a reel pressure spring 38 which is designed to abut against the reels 16 in order to stabilize the operation of the reels 16 and enable the tape 18 to run in a uniform fashion. The first section 36 has a sufficient thickness $t_f$ to support the reel pressure spring 38 so that it can exert an appropriate biasing force toward the reels 16. Preferably, the reel spring 38 is an elongated rectangular plate made in a manner that the opposite distal ends thereof depress the reels 16. It is to be noted that the first section 36 may further include a pair of windows 40 through which the user can observe the winding of the videotape 18 around the reels 16, the reel spring 38 interposing between the windows 40.

Figure 3:
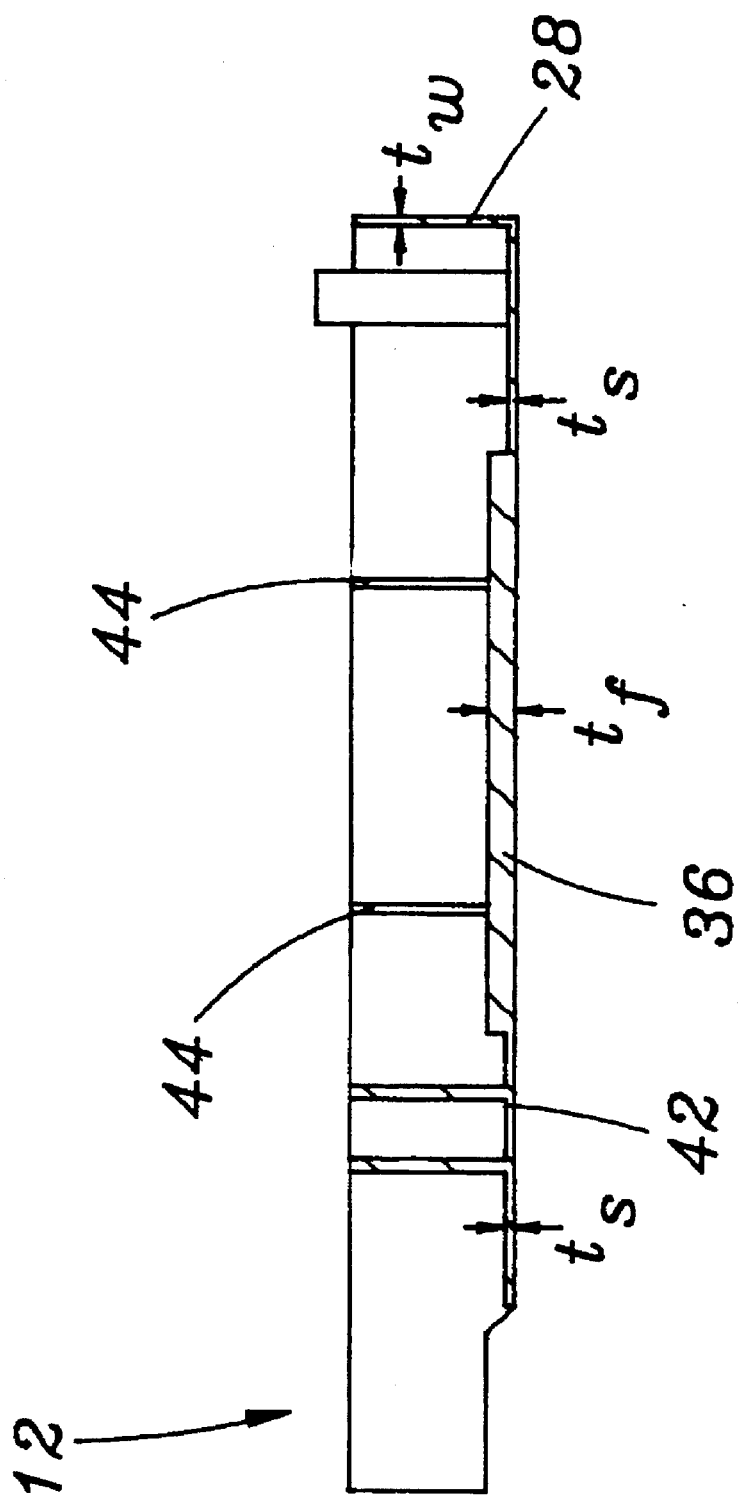
FIG. 3 is a cross-sectional view taken along line III—III of FIG. 2a, depicting a variation in the thickness of the upper casing.

Referring to FIGS. 2a and 3, the first section 36 is surrounded with a second section 42 which is of a thickness $t_s$ different from $t_f$ of the first section 36. In the present invention, the thickness $t_s$ is preferably thinner by 30 percent, more preferably by 50 percent, than the thickness $t_f$ of the first section. Preferably, the second section thickness $t_s$ is substantially the same as those $t_w$ of the rear and the side walls 28, 32, the thickness of each wall also being substantially the same with respect to each other.

The reduced thickness in the second section 42 of the base panel 20 and the walls 28, 32 is obtained by means of a plurality of reinforcing ribs 44 inwardly projecting from the rear and the side walls so that the walls and the second section can be properly strengthened. Each rib 44 preferably has a trapezoidal form in the longitudinal cross-section, i.e., its bottom area being larger than its top area as clearly illustrated in a circle shown in FIG. 2*a*.

Figure 2B:
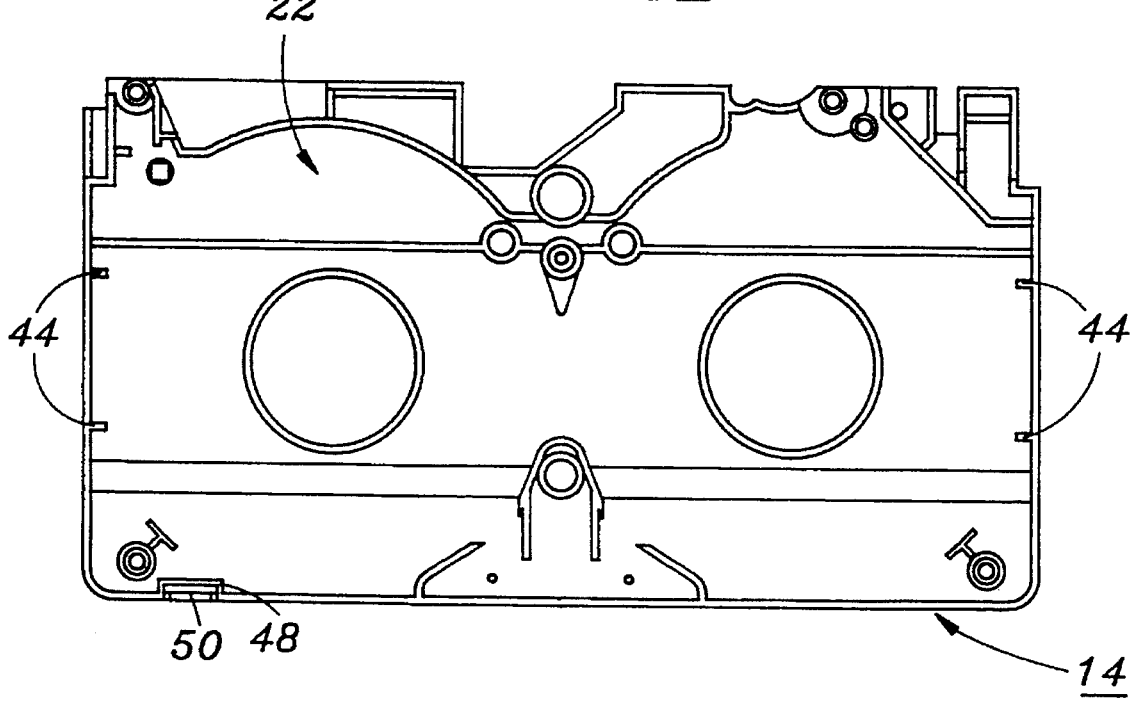

Formed on the rear wall 28 is also a shielding rib 46 which is arranged to further reinforce the upper casing 12 and to prevent contaminants from entering the cassette housing in cooporation with a depression 48 formed by a deformation of the rear wall 30 of the lower casing 14 as shown in FIG. 2*b*. The depression 48 serves to preclude the possibility of either overrecording new signals or erasing prerecorded signals on or from the videotape in error when the depression is detected by the VCR(not shown). It is well known to those skilled in the art that, in order to enable new signals to override existing recorded signals, the depression 48 may be covered by, for example, a removable tab 50 as illustrated.

Although the invention has been shown and described with respect to the exemplary embodiments hereof, it should be understood by those skilled in the art that various changes, modifications and/or additions may be made without departing from the spirit and scope of the invention as defined in the following claims.

What is claimed is:

1. A videotape cassette including an upper and a lower cassette casings combined together to contain therein a pair of tape reels, characterized in that the upper cassette casing comprises:

a base panel including a first elongated section which carries a pressure spring adapted to depress the tape reels toward the lower cassette casing, and a pair of elongated second sections, having a thickness less than that of the first section, the first section lying between the second sections; and peripheral walls, vertically extending from their corresponding edges of the base panel, including a plurality of reinforcement ribs which inwardly protrude therefrom, each of the peripheral walls having substantially the same thickness as that of the second sections.

2. The videotape cassette as recited in claim 1, wherein each of said reinforcement ribs has a trapezoidal cross-section.

3. The videotape cassette as recited in claim 1, wherein the thickness of the second sections and said peripheral walls is less than that of the first section by 50 percent.

* * * * *